United States Patent [19]

Donelly et al.

[11] 4,442,079

[45] Apr. 10, 1984

[54] PROCESS FOR REMOVAL OF NITROGEN OXIDES AND SULFUR OXIDES FROM WASTE GASES

[75] Inventors: James R. Donelly, Ballerup; Karsten S. Felsvang, Allerod, Denmark; Per Morsing, Vedbaek, all of Denmark; Preston L. Veltman, Severna Park, Md.

[73] Assignee: A/S Niro Atomizer, Soborg, Denmark

[21] Appl. No.: 382,968

[22] Filed: May 28, 1982

[30] Foreign Application Priority Data

Oct. 12, 1981 [DK] Denmark .......................... 4507/81

[51] Int. Cl.$^3$ .......................... B01J 8/00; C01B 21/00; C01B 17/00
[52] U.S. Cl. .................................. 423/239; 423/235; 423/242; 423/244
[58] Field of Search ............. 423/235, 239, 242 A, 423/244 A, 235 D, 239 A, 242 R, 244 R

[56] References Cited

U.S. PATENT DOCUMENTS

| 3,310,365 | 3/1967 | Dundas et al. | 423/244 A |
| 3,498,743 | 3/1970 | Kyllonen | 423/239 |
| 3,880,618 | 4/1975 | McCroa | 423/244 |
| 3,969,482 | 7/1976 | Teller | 423/244 A X |
| 3,976,747 | 8/1976 | Shele et al. | 423/244 |
| 4,061,476 | 12/1977 | Holter et al. | 423/244 A X |
| 4,178,349 | 12/1979 | Wienert | 423/244 A |
| 4,197,278 | 4/1980 | Gehri et al. | 423/244 A X |
| 4,246,242 | 1/1981 | Butler et al. | 423/235 X |
| 4,279,873 | 7/1981 | Felsvang et al. | 423/242 A |

FOREIGN PATENT DOCUMENTS

| 50-150675 | 12/1975 | Japan | 423/242 |
| 53-137891 | 12/1978 | Japan | 423/239 |

*Primary Examiner*—Gregory A. Heller
*Attorney, Agent, or Firm*—Schuyler, Banner, Birch, McKie & Beckett

[57] ABSTRACT

A process for removal of nitrogen oxides and sulfur oxides from waste gases by contacting the waste gases with a particulate material comprising an alkaline earth based absorbent for sulfur oxides. Essential features are a reaction temperature of 85°–145° C., a maximum value of 3 for the ratio of nitrogen oxides to sulfur oxides, and the presence of oxygen and moisture. In its preferred form the process comprises a spray drying-absorption reaction followed by particle separation in a bag house. Removal efficiency is improved by the presence of minor amounts of sodium sulfite together with the alkaline earth based absorbent. Also a special conveyance of material may be applied to improve efficiency.

9 Claims, 4 Drawing Figures

PROCESS FOR REMOVAL OF NITROGEN OXIDES AND SULFUR OXIDES FROM WASTE GASES

BACKGROUND OF THE INVENTION

1. Field of the Invention

The present invention relates to a process for removal of nitrogen oxides and sulfur oxides from waste gases.

Several types of waste gases including flue gases and other combustion gases as well as waste gases from high temperature metallurgical processes contain noxious nitrogen oxides in such amounts that the release of said gases may involve an environmental risk.

The presence of nitrogen oxides in e.g. flue gases is due to the fact that nitrogen oxides may be produced by pyrolysis of nitrogen containing compounds present in the fuel and may moreover be formed by reactions of $N_2$ and $O_2$ at elevated temperature. Usually the nitrogen oxides are mainly present as NO, but also the other nitrogen oxides, especially $NO_2$, are normally present. In the following all these nitrogen oxides are represented by the formula $NO_x$.

Waste gases containing nitrogen oxides often contain also sulfur oxides, especially sulfur dioxide and in minor amounts sulfur trioxide, which sulfur oxides are represented by the formula $SO_x$.

These sulfur oxides are generated by the combustion of sulfur containing fuel or they are formed in metallurgical processing.

Since it is also desired to avoid disposal of large amount of $SO_x$ to the atmosphere, there is a need for a process suitable for reducing not only the $NO_x$ content but also the $SO_x$ content of waste gases before disposal of the latter into the atmosphere.

2. Description of the Prior Art

Several methods have been suggested for simultaneous removal of $NO_x$ and $SO_x$ from waste gases. A review of such methods is presented in "Environmental Control Implications Of Generating Electric Power From Coal, 1977 Technological Status Report, Appendix G" prepared by Tennessee Valley Authority, Muscle Shoals, Ala., December 1977, reproduced by National Technical Information Service, Springfield, U.S.A.

These Prior Art processes may be divided into "wet processes" and "dry processes" dependent on whether or not the $NO_x$ is absorbed by means of an aqueous solution or suspension.

Of these two categories of processes the dry types are generally to be preferred to avoid those drawbacks of the wet systems which are caused e.g. by the insolubility of $NO_x$ in aqueous liquids, the extensive cooling of the waste gas, and the formation of sludge the disposal of which may cause troubles. Moreover equipment investments are substantially higher in wet processes than in dry processes.

The process according to the present invention is a dry type process.

The prior art dry processes although superior to the wet processes have certain drawbacks among which are requirement for ammonia or relatively expensive absorbents based on activated carbon. Moreover some of the dry processes use higher reaction temperatures than desirable. Also a drawback of the prior art dry processes is the sensitivity of these processes to particulates, e.g. fly ash, in the waste gas.

A prior art dry process which is reported as enabling a very efficient $NO_x$ removal utilizes radiation of the $SO_x$ and $NO_x$ containing waste gas with an electron beam thereby causing reactions between $SO_x$ and $NO_x$ resulting in products which may be separated from the gas by means of an electrostatic precipitator. However, this process demands large capital investments.

Besides the reduction processes in which ammonia is used to selectively reduce $NO_x$ to $N_2$, other reductive methods have been suggested using hydrocarbons, carbon monoxide or hydrogen as reductants. Both of these methods, however, require large amounts of reductants in case the gas contains other oxidants than $SO_x$ and $NO_x$, e.g. oxygen. This methods also operate at higher temperatures than convenient when flue gases are to be treated.

A further dry type process is based on adsorption of $SO_x$ and $NO_x$ on specially activated carbon. The adsorbed $NO_x$ is converted to $NO_2$ as the carbon is heated to about 650° C. for regeneration. This regeneration procedure, however, makes the total operation rather complex.

In U.S. Pat. No. 4,273,750 it has been illustrated that by using hydrated lime for desulfurization of flue gases in a dry process also a certain decrease of the $NO_x$ level in the flue gas takes place. According to said specification the flue gas which contained $SO_2$ and $NO_x$ was contacted with the hydrated lime at temperatures between 316° C. and 149° C. The $NO_x$ removal by said process is, however, not as efficient as desired.

In a paper by Brown et al: "Interactions of stack gas sulfur and nitrogen oxides on dry sorbents" National Environmental Research Center, North Carolina, September 1973 (distributed by National Technical Information Service, Springfield) it is disclosed that the concentration of $NO_x$ and $SO_x$ decreases when a gas containing said two components is dryed by means of Drierite or molecular sieves. Drying by means of calcium chloride, however, did not seem to influence $NO_x$ and $SO_x$ concentrations. That discovery has, however, not been utilized in any industrial process for waste gas purification, probably because of complications involved in regeneration of the Drierite or molecular sieves.

SUMMARY OF THE INVENTION

We have now found that nitrogen oxides and sulfur oxides may be removed from waste gases by contacting said gases with a particulate material comprising an alkaline earth based absorbent for sulfur oxides provided that a combination of conditions is fulfilled.

These conditions are the following:

First of all the reaction temperature should be between 85° and 145° C. since outside these limits the $NO_x$ removal is insufficient.

The ratio of nitrogen oxides to sulfur oxides should be 3 or below.

Oxygen and moisture should be present, since otherwise the reactions between $NO_x$ and $SO_x$ essential to the removal of these gases, will not take place.

Therefore the present invention relates to a process for removal of nitrogen oxides and sulfur oxides from waste gases in which the molar ratio of nitrogen oxides to sulfur oxides is 3 or below comprising contacting said waste gases with a particulate material comprising an alkaline earth based absorbent for sulfur oxides, securing during at least a part of the contact period a temperature of the gas of 85°–145° C. and the presence of oxygen and H₂O.

It has not been investigated which chemical reactions are involved in the removal of $NO_x$ and $SO_x$ in the process. However, it has been established that the temperature is a very critical parameter of these reactions, and the optimum temperature is about 100°–110° C. as explained in more details below.

Tests have shown that a satisfactory $NO_x$ removal by the process is only possible when at least one mole sulfur oxide is present for each three mole nitrogen oxides which means that in case the process is applied in connection with previous desulfurization methods, care should be taken not to remove a too high proportion of sulfur oxides in said preceding desulfurization.

A substantial decrease of the efficiency of the process has been experienced when the oxygen concentration in the waste gas becomes lower than app. 0.5% by volume. This means that if the process is to be used in connection with preceding nonselective catalytic reduction methods for $NO_x$ and $SO_x$ removal, as described above, care should be taken to increase the oxygen content of the waste gas before treatment by the process according to the invention. The same of course applies in case the waste gas results from a reducing combustion or from any other source delivering a waste gas of very low oxygen content.

It has surprisingly been found that even with $NO_x$ and $SO_x$ concentrations of a few hundred ppm the above relatively high oxygen concentration of at least 0,5% (corresponding to 5000 ppm) is essential.

A substantial advantage of the process according to the invention resides in the fact that the process may be performed by using equipment of the type used for conventional known desulfurization processes.

The process may be performed as a modification of desulfurization processes of the type dealt with e.g. in U.S. Pat. No. 4,279,873, (incorporated herein by reference) viz. processes in which an aqueous absorbent-containing suspension is atomized in hot waste gas whereby the atomized suspension is dried to form a powder, while a substantial amount of the $SO_x$ is simultaneously absorbed.

The preferred embodiment of the process according to the invention comprises the steps of
  (a) preparing an aqueous suspension comprising a basic alkaline earth metal compound;
  (b) atomizing said suspension into the hot waste gas in a drying chamber for simultaneous drying of the resulting atomized droplets and absorption of a portion of the sulfur oxides in the waste gas, the amount of basic compound atomized being restricted to secure the molar ratio of nitrogen oxides to sulfur oxides in the gas does not exceed 3;
  (c) adding any $O_2$-containing gas necessary to provide an $O_2$-concentration in the waste gas of 0.5% by volume or above;
  (d) introducing the gas together with entrained particles formed by the drying and absorption in step (b) into a particle separation device securing that during at least a part of the residence time of the gas and the particles in said separation device the temperature of the gas is 85°–145° C.;
  (e) withdrawing the particles separated in said particle separation device; and
  (f) withdrawing and discharging the gas from said particle separation device with a substantially decreased content of nitrogen oxides and sulfur oxides.

By this embodiment the main part of the $SO_x$ is absorbed in step (b) while substantially all $NO_x$ removal takes place in step (d) in which step also a substantial $SO_2$ removal occurs.

Said basic alkaline earth metal compound used for preparing the aqueous suspension is preferably slaked lime, including dolomitic lime, i.e. $Ca(OH)_2$ and/or $Mg(OH)_2$.

It has surprisingly been found that the presence of some sodium sulfite together with the basic alkaline earth metal compound substantially improves $NO_x$ removal in step (d). Also $Fe^{2+}$ together with EDTA improves $NO_x$ removal.

Consequently a preferred embodiment of the process according to the invention is characterized in that a sodium compound selected from sodium sulfite and sodium compounds forming sodium sulfite by contact with $SO_2$ is introduced into the process in an amount of 1–20% based on the weight of particulate material with which the gas is contacted. Said sodium sulfite or sodium compounds may be introduced in one or more steps of the process as explained below.

The improvement of the $NO_x$ removal obtained by addition of said sodium compounds is especially surprising on the basis of the fact that if the basic alkaline earth metal compound is completely replaced by sodium compounds forming sodium sulfite by contact with $SO_2$, substantially no $NO_x$ removal will be experienced.

Alternatively the process of the invention may be performed as a modification of the so-called dry injection desulfurization processes as described e.g. in published Danish patent specification 2854/79 (incorporated herein by reference) corresponding to U.S. Ser. No. 243,943 or in the above U.S. Pat. No. 4,273,750. In this case the desired temperature of 85°–145° C. may be obtained by spraying water into the gas either upstream of the injection of dry absorbent into the waste gas stream or between the location for this injection of dry absorbent and the location for collection of spent absorbent from the gas.

BRIEF DESCRIPTION OF THE DRAWINGS p
The process according to the invention is illustrated further in the following with reference to the drawing where FIG. 1 shows two graphs indicating the optimum temperature for NO removal, FIG. 2 illustrates the basic concept of the invention as explained above, FIG. 3 is a very simplified flow sheet of a preferred embodiment of the process according to the invention, and FIG. 4 also is a very simplified flow sheet illustrating an improvement of the preferred embodiment of FIG. 3.

FIG. 1 has two graphs A and B showing the % NO removal plotted against the reaction temperature. Graph A refers to tests performed on a test stand as described in the below Examples 1–12 whereas graph B refers to pilot plant tests as described in Examples 13–20. % $NO_x$ removal represented by graph B should only be evaluated on a relative basis since achievement of higher values for % $NO_x$ removal is possible also in continuous operation when also the other parameters of the process are optimized.

DESCRIPTION OF THE PREFERRED EMBODIMENTS

Figure 3:
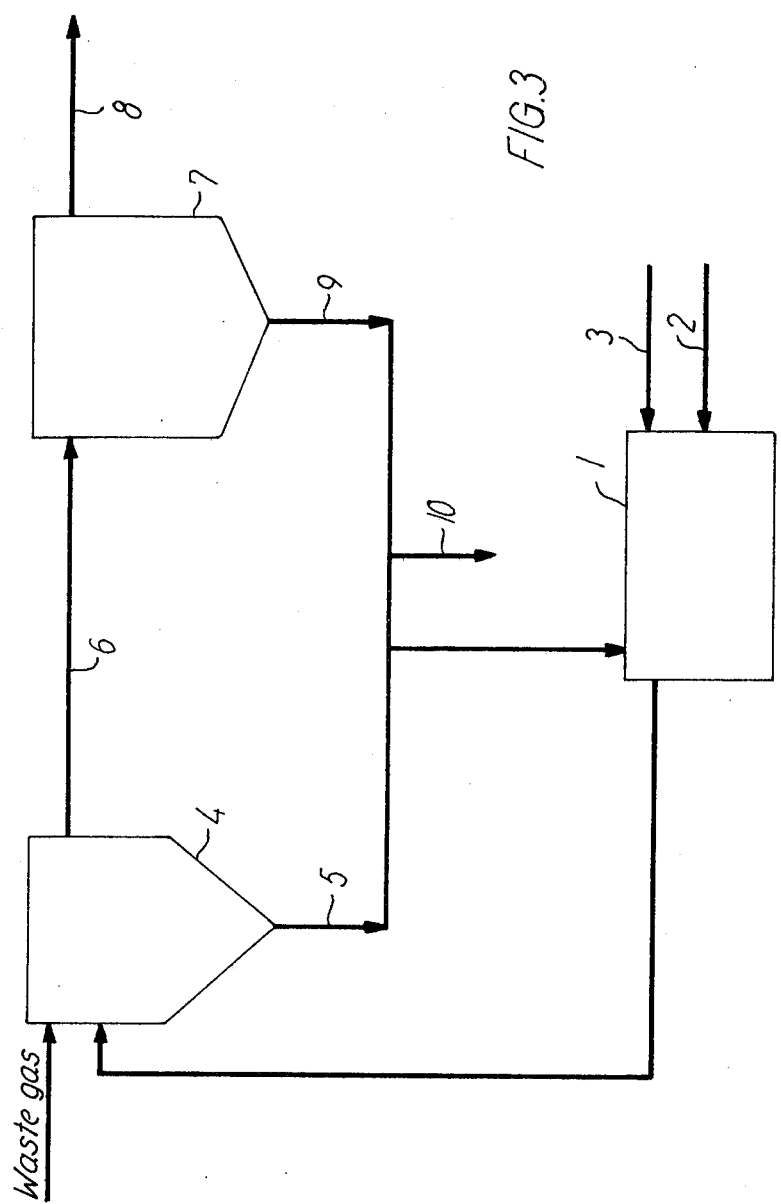

In FIG. 3, 1 represents a feed preparation system which in the most simple embodiment consists of a mixing tank. 2 represents a supply of an alkaline earth based absorbent, and 3 represents a water conduit.

In the feed preparation system 1 an aqueous suspension of said absorbent is prepared which suspension is atomized into a drying chamber 4. To said drying chamber is conducted a stream of hot $SO_x$ and $NO_x$ containing waste gas to be purified by the process, and e.g. originating from a boiler. In the drying chamber the atomized droplets are dried to a powder and simultaneously a substantial amount of the $SO_x$ in the waste gas is absorbed and is thereby transformed into sulfite and sulfate forming a constituent of said powder.

In the embodiment shown a portion of said powder may be recovered from the bottom of the drying chamber together with a portion of any fly ash present in the waste gas to be treated. Said recovering takes place through conduit 5.

The gas entraining the remaining part of said powder and the remaining part of any fly ash is withdrawn from the drying chamber through conduit 6 debouching into a particle separation device 7 which is preferably a fabric filter baghouse. However, the particle separation device may alternatively be an electrostatic precipitator or another type of dust collector.

In the drying chamber 4 a substantial part of the $SO_x$ in the waste gas is absorbed. However, the amount of absorbent atomized into the spraying chamber is restricted to secure that the gas is not that deprived of $SO_x$ at this stage that the $SO_x$ concentration (on molar basis) becomes less than $\frac{1}{3}$ of the $NO_x$ concentration.

In the most simple embodiment the amount of water evaporated in the drying chamber is adjusted to secure a temperature of the gas and particles in the particle separation device 7 of 85°–145° C.

The $NO_x$ removal primarily takes place in the particle separation device 7.

Due to the water evaporation in the drying chamber 4 the water content of the gas reaching the particle separation device 7 will be sufficient to achieve a substantial $NO_x$ removal in said device 7.

If the oxygen concentration of the waste gas is below 0.5% by volume, oxygen, preferably as air, is introduced at any convenient site (not shown) before the gas reaches the particle separation device.

From the device 7 the waste gas with reduced $NO_x$ and $SO_x$ content is conducted to a stack (not shown) through duct 8.

The particles separated from the gas in device 7 consist of material formed in the spray drying-absorption reaction in the chamber 4 and possibly fly ash, and are withdrawn through conduit 9. At least a portion of the particles recovered through 9 and/or 5 are purged from the system as indicated by conduit 10. The remaining portion of the particles recovered from 9 and 5 is recycled to the feed preparation system 1 to reduce requirements for fresh absorbent.

Instead of recovering particulate material through 5 all particles may be entrained by the gas stream through 6 to the particle separation device 7 as in come conventional desulfurization processes.

Figure 4:
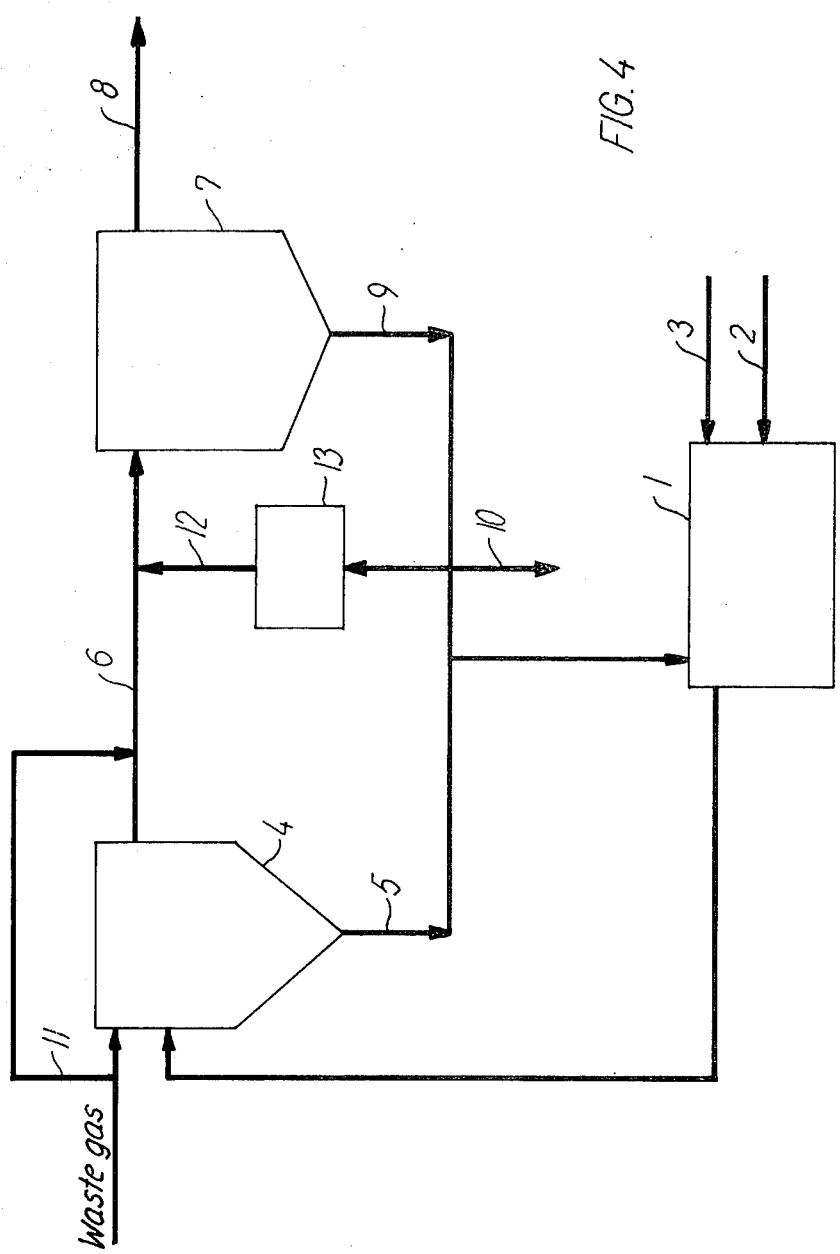

An improved embodiment of the described process is depicted in FIG. 4, in which the reference numerals 1–10 have the same significance as in FIG. 3.

11 represents a by-pass conduit through which a partial stream of the hot waste gas is by-passed the drying chamber 4. Said partial stream is preferably withdrawn at a location upstream of any heat exchanger (not shown) for preheating air to the boiler. Consequently the temperature of the partial stream will be rather high e.g. 300°–500° C. This partial stream of hot waste gas is reintroduced in the main stream of a waste gas in conduit 6 after said main stream has been treated in 4.

By this measure, it is possible to adjust the spray drying-absorption process in the chamber 4 to obtain optimum temperatures for the desulfurization taking place in said chamber. These optimum temperatures correspond to a temperature for the gas leaving the drying chamber of 40°–85° C.

In the conduit 6 this relatively cool gas is mixed with the hot by-passed stream of waste gas delivered through 11 whereby the temperature of the gas is raised to a value providing optimum $NO_x$ removal in the particle separation device 7, viz. a temperature between 85° and 145° C. By this arrangement optimum conditions are obtained both for the $SO_x$ removal in the drying chamber 4 and for the $NO_x$ removal in the particle separation device 7.

By-passing a partial stream of waste gas as illustrated in FIG. 4 is known per se from German published Patent Application No. 30 11 177. However, in said German application by-passing of waste gas is performed with the sole purpose to allow a smaller and consequently cheaper spray dryer to be used, and the by-passing is not suggested as a measure to adjust the temperature in the particle separation device.

A further improvement is shown in FIG. 4, where 12 represents a conduit for introducing particulate material to the waste gas upstream of the particle separation device 7. Said particulate material may comprise particles recovered through conduit 5 and/or 9.

Before the particulate material is introduced into the waste gas through 12, it may be treated in a powder treatment system 13. In this system 13 the particles are treated with water, preferably in an amount providing a moisture content of the particles of 4–9% by weight, which results in an increased $NO_x$ and $SO_x$ removal in the device 7.

The water treatment in the powder treatment system 13 is preferably performed by supplying an aqueous solution of sodium sulfite or of an alkaline sodium compound such as sodium hydroxide or sodium carbonate. Introduction of a sodium compound in this stage of the process seems to be even more beneficial to $NO_x$ removal in device 7 than addition of sodium compounds to the feed preparation system 1.

The invention will be further illustrated by means of the following Examples, in which all percentages and parts referring to gases are by volume unless otherwise specified.

EXAMPLES

Examples 1–12 made on test stand having fixed bed reactor.

In each of these Examples the gas from which $NO_x$ and $SO_x$ should be removed was conducted through a reactor having a fixed filter-supported bed of powder through which the gas passed. In each Example 50 g powder was used originating from a system in which desulfurization had been performed by means of dry lime for which reason the main constituents of the powder were calcium sulfate, calcium sulfite and calcium hydroxide. To improve the $NO_x$ absorption the powder had been treated with 10 ml aqueous solution containing 2.5 g $Na_2SO_3$.

The reactor was provided with means enabling a preset temperature to be maintained therein.

The composition of the gas was analysed before and after passage through the reactor.

a. Examples 1-5 showing the effect of the temperature:

A gas consisting of 95% $N_2$ 5% $O_2$, 300 ppm NO and 300 ppm $SO_2$ (on dry basis) with a dew point of 50° C. were let through the reactor in an amount of 370 l/h. In each Example the average NO and $SO_2$ removal obtained in the first hour was determined. The reaction temperatures and the corresponding NO and $SO_2$ removal appear from the following table 1

TABLE 1

| Example No. | Reaction temperature (°C.) | NO removal (1st hour average) (%) | $SO_2$ removal (1st hour average) (%) |
|---|---|---|---|
| 1 | 70 | 11 | 72 |
| 2 | 80 | 32 | 86 |
| 3 | 90 | 53 | 91 |
| 4 | 100 | 70 | 91 |
| 5 | 110 | 57 | 66 |

Figure 1:
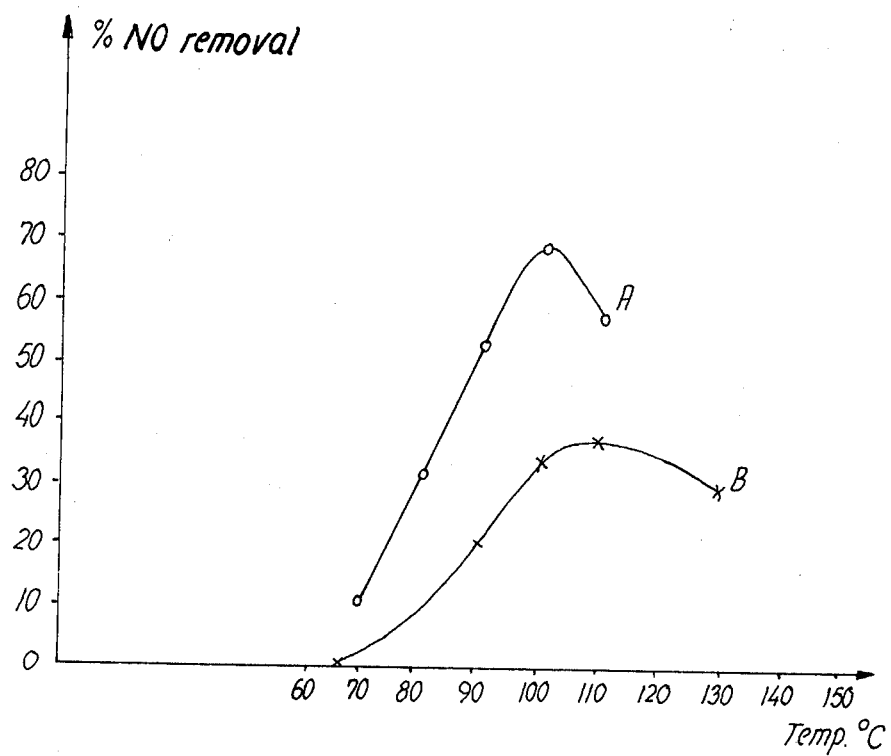
Figure 2:
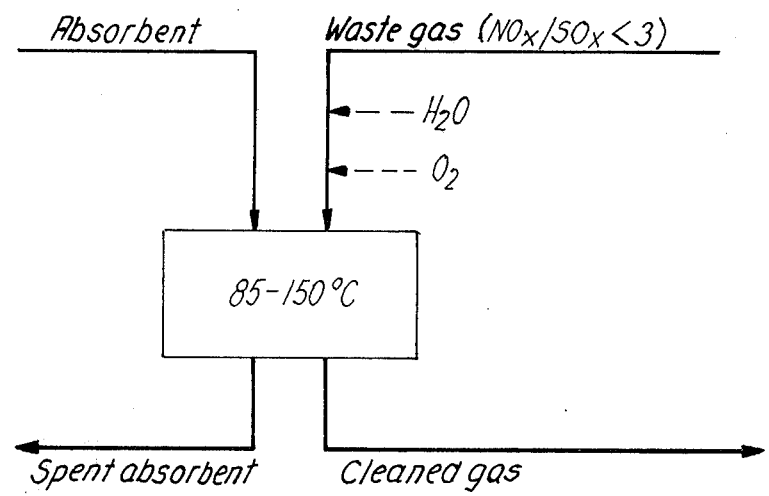

The NO-absorption from this table has been plotted in FIG. 1 as graph A.

b. Examples 6-8 showing the effect of oxygen:

The test conditions were similar to Example 4, except that a part of the oxygen in the gas was replaced by nitrogen to obtain oxygen contents of 1.5%, 0.80% and 0.15%, resp. The results are tabulated in table 2 together with the results from Example 4:

TABLE 2

| Example | $O_2$ % in gas | NO removal (1st hour) | $SO_2$ removal (1st hour) |
|---|---|---|---|
| 6 | 0.15 | 0% | 80% |
| 7 | 0.80 | 47% | 92% |
| 8 | 1.5 | 56% | 92% |
| 4 | 5.0 | 70% | 91% | c. Examples 9 and 10 showing the effect of $NO/SO_2$ ratio:

The test conditions were similar to the conditions in Example 4, except that the $SO_2$ concentrations were 100 ppm and 900 ppm, resp. in stead of 300 ppm.

The results of these two Examples are tabulated in table 3 together with the results from Example 4.

TABLE 3

| Example No | $SO_2$ ppm | NO ppm | $NO/SO_2$ | NO removal (1st hour) | $SO_2$ removal (1st hour) |
|---|---|---|---|---|---|
| 9 | 100 | 300 | 3 | 34% | 92% |
| 4 | 300 | 300 | 1 | 70% | 91% |
| 10 | 900 | 300 | ⅓ | 60% | 64% |

It appears from Table 3 that the presence of $SO_2$ is essential to the removal of NO and that a $NO/SO_2$ ratio above 3 results in an inferior NO removal.

d. Examples b 11 and 12 showing the effect of moisture:

In Example 11 the test conditions were similar to Example 4, except that no moisture was present in the gas.

In Example 12 also dry gas was used but in this Example the $Na_2SO_3$-treated powder was dried in the reactor before contact with NO and $SO_2$ by passing $N_2$ at 100° C. through the powder for two hours.

The results from Example 11 and 12 are tabulated in Table 4 together with the results from Example 4.

TABLE 4

| Example No. | Test condition | NO removal (1st hour) | $SO_2$ removal (1st hour) |
|---|---|---|---|
| 4 | Moist gas moist powder | 70% | 91% |
| 11 | Dry gas moist powder | 40% | 71% |
| 12 | Dry gas dry powder | 30% | 34% |

Table 4 shows that the presence of moisture is of importance not only for $SO_2$ removal (which is well known) but also for NO removal.

Examples 13-20 made on pilot plant.

The following Examples were performed in a pilot plant of the type depicted in FIGS. 3 and 4. The particle separation device 7 was a bag house.

(a) Examples 13-17 showing the effect of the temperature:

In these Examples 2000 kg/h waste gas containing $O_2$, $CO_2$, $H_2O$, NO and $SO_2$ was cleaned using hydrated lime as absorbent. The NO and $SO_2$ concentrations were 500 ppm and 1500 ppm, resp. at the inlet to the drying chamber 4.

The gas temperature at the outlet of the drying chamber and at the outlet of the bag house were changed at it appears from Table 5. NO removal and $SO_2$ removal were determined for the drying chamber alone and for the drying chamber + the bag house.

TABLE 5

| Example | Drying chamber outlet Temp. (°C.) | Bag house outlet Temp. (°C.) | NO removal Drying chamber (%) | NO removal Drying chamber + bag house (%) | $SO_2$ removal Drying chamber (%) | $SO_2$ removal Drying chamber + bag house (%) |
|---|---|---|---|---|---|---|
| 13 | 66 | 66 | 0 | 0 | 72 | 100 |
| 14 | 90 | 88 | 6 | 21 | 54 | 83 |
| 15 | 101 | 99 | 8 | 35 | 35 | 67 |
| 16 | 110 | 106 | 5 | 37 | 25 | 55 |
| 17 | 130 | 124 | 5 | 30 | 15 | 34 |

The results for total NO removal have been plotted as graph B in FIG. 1.

b. Example 18 showing the effect of alkaline sodium compounds in the feed suspension.

This Example was performed as described for Example 15, except that 11% by weight of the lime was replaced by NaOH. The NO removal was 2% in the drying chamber and 44% totally, which means an improvement of 9%. The $SO_2$ absorption was 41% in the drying chamber and 73 totally.

c. Example 19 showing the effect of injecting treated powder into the waste gas in the bag house inlet duct:

The test conditions were similar to Example 15 apart form the fact that 115 kg/h powder from the bag-house were dried at 150° C. to remove surface water and hydrate water and subsequently treated with 18 kg/h aqueous solution containing 16% by weight $Na_2SO_3$. After this treatment the powder was injected into the inlet duct of the bag house and thereby suspended in the gas. In this Example the NO removal was 10% in the drying chamber and 63% totally. The $SO_2$ removal was 38% in the drying chamber and 96% totally. This means that substantially improved results were obtained over those obtained in Example 15.

d. Example 20 illustrating a preferred embodiment using reheat.

In this Example a partial stream of waste gas was by-passed the drying chamber as illustrated in FIG. 4. Otherwise the test conditions were as in Example 18. The amount of waste gas by-passed the drying chamber was 14% and this by-passed stream was heated to 290° C. and mixed with the drying chamber outlet gas in order to increase the temperature thereof from 83° C. to 110° C. The bag house outlet temperature was 105° C.

The NO removal was 0% in the drying chamber and 38% totally. The $SO_2$ removal was 72% in the drying chamber and 98 totally. These results show that by using the reheating and by-passing procedure it is possible to improve the $SO_2$ removal and at the same time keep the NO removal at an acceptable level.

e. Example 21 illustrating use of $Fe^{2+}$ plus EDTA.

This example was performed on the same test stand as Examples 1-12.

The gas consisted of air with 100 ppm NO and 300 ppm $SO_2$ and had a dew point of 55° C. The absorbent powder forming the bed was as described in Examples 1-12 apart from the fact that a treatment with 10 ml aqueous solution containing 0,80 g Fe $SO_4$; $7H_2O$ and 0,6 g EDTA has been substituted for the treatment with $Na_2 SO_3$ solution.

The reaction temperature was 100° C.

Shortly after the test was started the NO removal peaked at 96%, after 10 min. it declined to 62% and after 60 min. it was 19%.

We claim:

1. A process for removal of nitrogen oxides and sulfur oxides from waste gases in which the molar ratio of nitrogen oxides to sulfur oxides is 3 or below comprising subjecting said waste gases to a nitrogen oxides removing contact by contacting said waste gases with a particulate material comprising an alkaline earth based absorbent for sulfur oxides which absorbent also includes an additive selected from (i) sodium sulfite, (ii) sodium compounds forming sodium sulfite by contact with $SO_2$, (iii) divalent iron together with EDTA and (iv) mixtures thereof in an amount of 1-20% based on the weight of said absorbent, securing during at least a part of the contact period a temperature of the gas of 85°-145° C. and the presence of $H_2O$ and at least 0.5% by volume oxygen.

2. A process for removal of nitrogen oxides and sulfur oxides from hot waste gases in which the molar ratio of nitrogen oxides to sulfur oxides is below 3, comprising the steps of (a) preparing an aqueous suspension comprising a basic alkaline earth metal compound;

(b) atomizing said suspension into the hot waste gas in a drying chamber for simultaneous drying of the resulting atomized droplets and absorption of a portion of the sulfur oxides in the waste gas, the amount of basic compound atomized being restricted to secure the molar ratio of nitrogen oxides to sulfur oxides in the gas does not exceed 3, (c) maintaining an $O_2$-concentration in the waste gas of 0.5% by volume or above;

(d) introducing the gas together with entrained particles formed by the drying and absorption in step (b) into a particle separation device securing that during at least a part of the residence time of the gas and the particles in said separation device the temperature of the gas is 85°-145° C.;

(e) withdrawing the particles separated in said particle separation device; and (f) withdrawing and discharging the gas from said particle separation device with a substantially decreased content of nitrogen oxides and sulfur oxides.

3. The process of claim 2 wherein the amount of water evaporated in step (b) is adjusted to lower the temperature of the gas to 40°-85° C. and before proceeding with step (d) the gas is heated to 85°-145° C. by admixture with a stream of the hot waste gases having by-passed step (b).

4. The process of claim 2 wherein the particles include an additive selected from (i) sodium sulfite, (ii) sodium compounds forming sodium sulfite by contact with $SO_2$, (iii) divalent iron together with EDTA and (iv) mixtures thereof in an amount of 1-20% based on the weight of particles with which the gas is contacted.

5. The process of claim 2 wherein a portion of particles withdrawn from the particle separation device in step (e) is dispersed in the gas treated in step (b) and thereby reintroduced into the particle separation device to improve contact between said particles and the gas.

6. The process of claim 2 wherein particles formed by the drying and absorption in step (b) is recovered from the bottom part of the drying chamber of which particles at least a portion is dispersed in the gas treated in step (b) and thereby carried into the separation device to improve contact between said portion of particles and the gas.

7. The process of claim 5 or 6 wherein said portion of particles to be dispersed in the gas and thereby introduced into the particle separation device is treated with a liquid selected from the group consisting of water, aqueous solutions of alkali metal sulfite, aqueous solutions of alkali metal compounds forming sulfite by contact with $SO_2$, and aqueous solutions containing iron in oxidation state 2 and EDTA.

8. The process of claim 7 wherein said liquid is applied in an amount providing a moisture content of 4-9% by weight in the treated portion of particles.

9. The process of claim 2, 3, 5 or 6 wherein the particle separation device is a bag filter unit.

* * * * *

UNITED STATES PATENT AND TRADEMARK OFFICE
CERTIFICATE OF CORRECTION

PATENT NO. : 4,442,079

DATED : April 10, 1984

INVENTOR(S) : James R. Donnelly, Karsten S. Felsvang, Per Morsing, and Preston L. Veltman It is certified that error appears in the above-identified patent and that said Letters Patent is hereby corrected as shown below:

First page, under heading "United States Patent", "Donelly et al." should read -- Donnelly et al. --, and Column 1, under "Inventors", "James R. Donelly" should read -- James R. Donnelly --.

Signed and Sealed this

Fifth Day of March 1985

[SEAL]

Attest:

DONALD J. QUIGG

*Attesting Officer*   *Acting Commissioner of Patents and Trademarks*